Oct. 31, 1950  S. RUBEN  2,527,576
FLAT PRIMARY CELL
Filed June 29, 1944  2 Sheets-Sheet 2
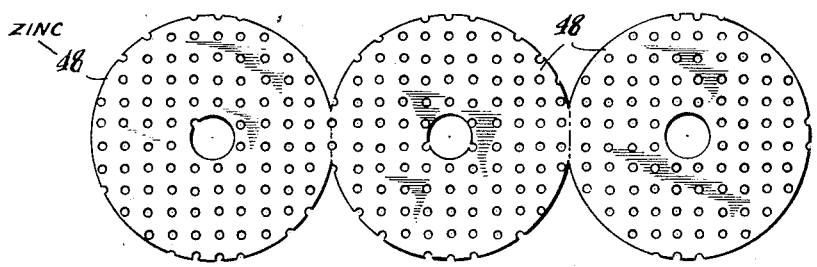
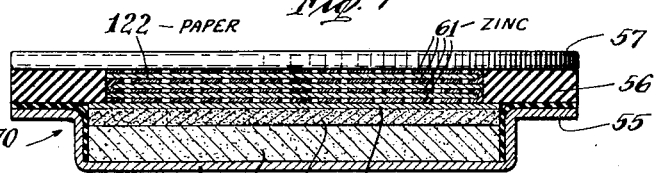
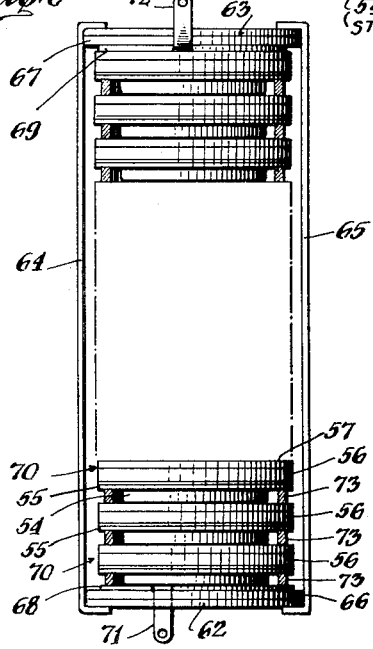
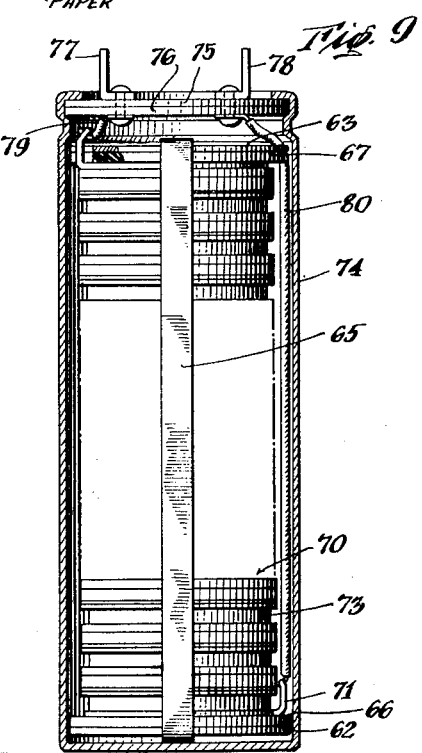
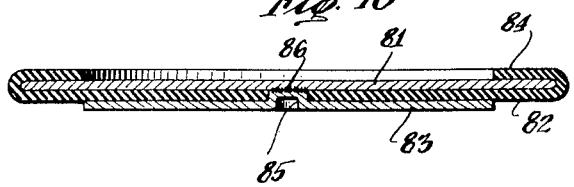
INVENTOR.
Samuel Ruben
BY Chester F. Carlson
ATTORNEY Patented Oct. 31, 1950

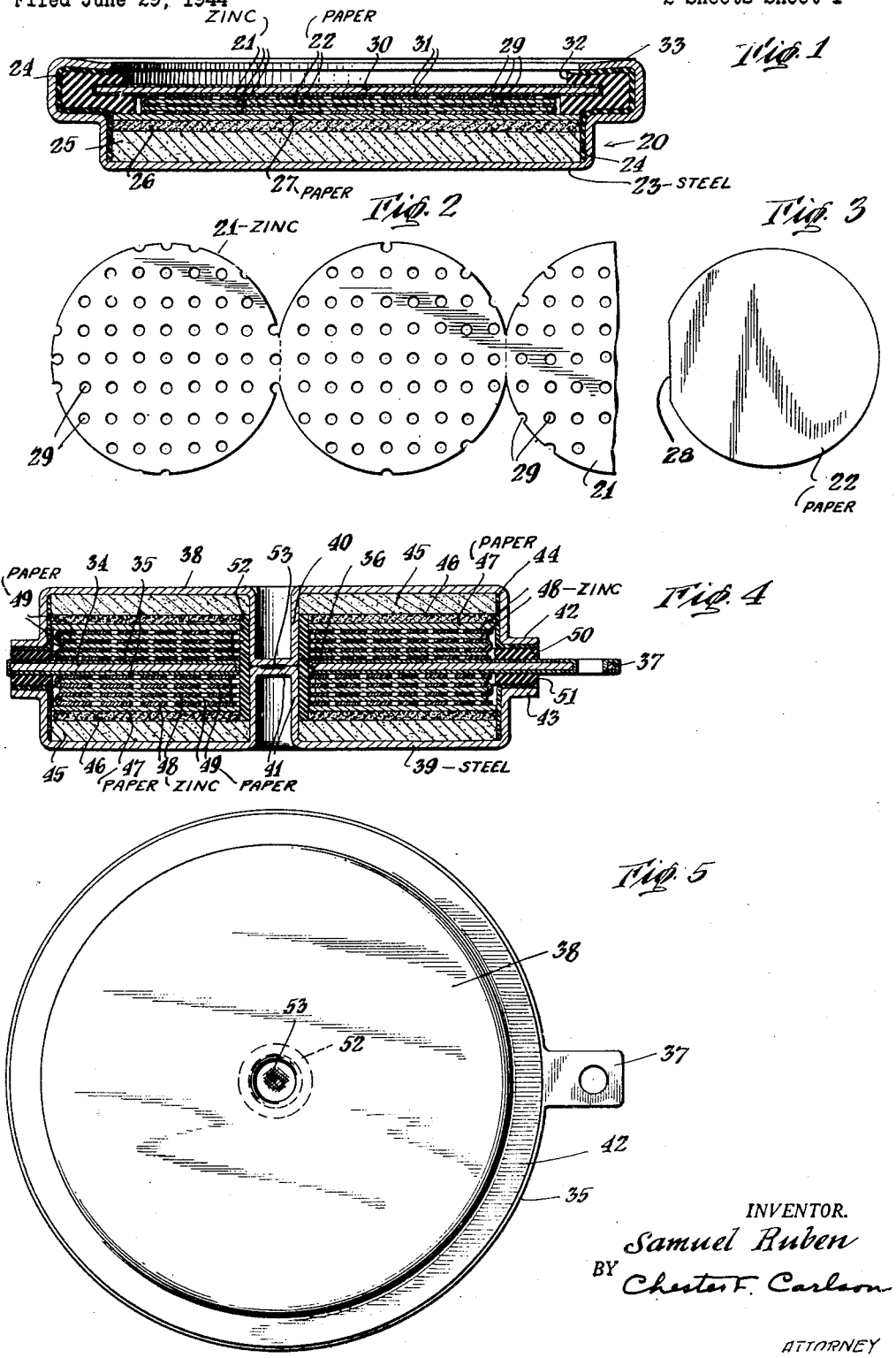

2,527,576

UNITED STATES PATENT OFFICE 2,527,576

FLAT PRIMARY CELL

Samuel Ruben, New Rochelle, N. Y.

Application June 29, 1944, Serial No. 542,722

14 Claims. (Cl. 136—111)

This invention relates to primary cells of the "dry" type.

An object of this invention is to improve the structure and composition of primary cells.

Another object is to provide a compact cell of convenient shape, which can, if desired, be made in small sizes and which makes effective use of the electrodes and electrolyte.

Other objects of the invention will be apparent from the description and claims.

In the drawings:

Figure 1 is a diametral section through a flat circular cell embodying features of the invention;

Figure 2 shows the cell electrode in partly completed form;

Figure 3 illustrates a paper spacer used with the electrode;

Figure 4 is a diametral section through a cell of modified structure;

Figure 5 is a face view of the cell;

Figure 6 shows a partly formed electrode for the cell of Figures 4 and 5;

Figure 7 is a diametral section of a further form of flat cell;

Figure 8 is a side elevation of a battery formed from cells of Figure 7;

Figure 9 shows the battery in a housing or container; and

Figure 10 shows a modified top for a primary cell.

The structures shown have their most suitable application for primary cells having zinc anodes, metal oxide depolarizing electrodes and alkaline electrolytes absorbed in porous spacing material. The preferred electrolyte comprises an alkali, such as potassium hydroxide solution which has been substantially saturated with zinc oxide prior to use of the cell. Such an electrolyte is described and claimed in my copending application Serial No. 486,367, filed May 10, 1943, now Patent No. 2,481,539, dated September 13, 1949.

Referring to the drawings, Figure 1 shows a construction of a flat cell 20, preferably circular in shape, hermetically sealed, and having a zinc anode 21 formed of several layers of perforated zinc foil spaced by layers of porous paper 22. The cell container and positive terminal comprises a shallow circular cup 23 of steel or other metal inert to the alkaline electrolyte. The side wall of the cup is preferably coated with an insulating coating 24 inert to the electrolyte, for example, polystyrene applied as a solution in xylol.

The depolarizing electrode comprises a pellet 25 of a reducible metallic oxide composition pressed into the bottom of the cup under high pressure, such as 5,000 pounds per square inch.

The depolarizer composition preferably may consist of mercuric oxide containing about 10% of micronized graphite. This is pressed into the depression of reduced diameter in the bottom of steel cup 23. Mercuric oxide has a long shelf life at high temperatures such as 140° F. and when mixed with micronized graphite it maintains the cell voltage without excessive drop under various loads encountered, or in other words produces a cell of good regulation.

For some services cupric oxide may be substituted. In some cases, particularly where cupric oxide is used, contact with the steel container may be improved by first painting or spraying the inside of the steel can on the bottom with a graphite paint formed, for example, of 10% by weight of graphite in a 2% ethyl cellulose in xylol solution. The depolarizer is pressed into the bottom of the container after the graphite paint has dried.

A porous barrier disc 26 of a material which is inert or substantially inert to the cell electrolyte and electrode materials is placed over the depolarizer layer. One of the best materials for this purpose is magnesium hydroxide which is pressed into a disc as a dry powder. Other useful materials are magnesium silicate, magnesium oxide, beryllium oxide, or an alkali-inert organic material such as polystryrene, vinyl resins or vinylidene resin powders pressed to form a porous compact. The disc 26 is placed in the cell in the dry state. It is also possible to spray the layer 26 onto the depolarizer by using a suspension of the powder is volatile solvent containing a small proportion of a dissolved resin binder, such as polystyrene.

A paper disc 27 of porous paper is disposed over barrier disc. Alkali treated natural cellulose paper, or viscose paper made of regenerated cellulose fibres are satisfactory. The paper disc is immersed in the cell electrolyte, drained of free-flowing liquid and laid on the barrier disc 26. Part of the electrolyte then passes into the barrier disc.

The preferred electrolyte comprises a solution of KOH substantially saturated with zinc oxide, which is present as potassium zincate. One method of making it comprises adding 36 grams of zinc oxide powder to 75 c. c. of distilled water, then adding 225 grams of C. P. potassium hydroxide (containing 87.25% KOH), heating to 150° C. and stirring to form a solution, the solution is cooled below 80° C., and 225 c. c. of water is added. The solution is then filtered and used.

The cell anode comprises a perforated zinc foil 21 cut into a chain of discs joined at their edges as shown in Figure 2. The chain is folded at the joined areas to bring the discs into a stack and a paper disc 22 (Fig. 3) is inserted between each pair of zinc layers. The circular paper discs 22 are cut away at one side to leave a straight edge which fits into the fold of the zinc anode when the paper disc is inserted. The perforations 29 in the several joined anode discs are preferably in substantial alignment when the anode is folded, as shown in Figure 1.

The paper for discs 22 may be porous cellulose or viscose paper which has been pre-shrunk by running it through a solution of 75 to 100 grams KOH in 100 c. c. of water, washing in plain water and drying. Discs punched from this paper may be of the same diameter as the zinc discs.

The zinc anode should be amalgamated to reduce local contact action with paper. One method is to bring a few drops of mercury into contact with the zinc while it is immersed in the normal cell electrolyte.

The folded anode, impregnated with electrolyte, is held in pressure contact with paper spacer disc 27 by top 30, which also comprises the negative terminal of the cell. Top 30 comprises a steel disc which has been electroplated with a thin layer of zinc 31 and then amalgamated. A zinc coating 0.3 mil thick which has been amalgamated in the aforementioned mercuric cyanide electrolyte is suitable.

An internally-grooved neoprene ring grommet 32 encloses the edge of the top disc. The flange 33 of the steel cup 23 is rolled or spun down over the grommet and applies a constant pressure to it, thereby sealing the cell closed.

In one cell constructed as shown in Figure 1 the depolarizer pellet 25 was 0.97 inch in diameter and 45 mils thick. The porous barrier layer 26 was 30 mils thick and paper layer 27 was 10–15 mils thick after impregnation. The anode was formed of 4 zinc layers each 5 mils thick and 3 paper layers about 4 mils thick making an anode thickness of about 30 mils, the anode having a diameter of 0.865 inch. The total quantity of electrolyte within the cell was 800 mg. Part of this was absorbed by the porous barrier disc from the impregnated paper after assembly, to afford an electrolyte path between the anode and depolarizer.

Figures 4 and 5 illustrate a dual cell construction. The negative terminal 34 of the cell is a steel disc having an amalgamated zinc-plated surface 35. It is provided with a central aperture 36 and has a terminal lug 37 on its edge. The positive terminal and cell container is made up of two steel cups 38 and 39 having central bosses 40 and 41 formed therein and having flanges 42 and 43 at their edges. When the cell is assembled the two cups are placed on opposite sides of the negative terminal disc and the heads of the bosses are welded together through the central aperture 36 as will be more fully described.

As both halves of the cell are similar and each in effect comprises an individual cell in parallel with the other, only one half will be described in detail. Cup 38 has its side wall and flange coated with an insulating layer 44. A layer 45 of the depolarizer composition is pressed into the bottom of the cup. A pressed porous disc 46, of magnesium hydroxide or the like, having a central aperture, is placed over the oxide, followed by paper ring 47 which has been impregnated with electrolyte. Folded anode structure 48 formed of a folded chain of perforated zinc rings shown in Figure 6, interposed with paper rings 49, is placed on top of the paper.

A pair of Neoprene rings 50 and 51 are placed on opposite faces of disc 34 and are preferably cemented to it with a Neoprene cement. It may be desirable to place the disc and cemented rings in an oven at 80° C. for 3–4 hours to dry or cure the cement.

A polystyrene tube 52 is placed in the central aperture of disc 34 and the two cups 38 and 39 are placed against opposite faces of the disc with their central bosses 40 and 41 inserted in the tube. The heads of the two bosses are brought together within the tube and welded at 53. Flanges 42 and 43 of the cups press against the Neoprene rings 50 and 51 when the cups are thus welded together, thereby sealing the cell. These cells may be stacked together and their terminal lugs connected, to form a parallel-connected battery.

Figure 7 shows a flat cell suitable for assembly in a stack of cells to form a battery. The container 54, which is the positive terminal, comprises a shallow steel cup having a flat outwardly extending flange 55 at its edge. A Neoprene ring 56 is cemented on top of this flange and the flat cover disc 57 of amalgamated zinc-plated steel rests on ring 56. In some cases it can be cemented on, but when the cell is held under pressure in a stack-up battery structure this is unnecessary. The internal structure of the cell comprising depolarizer 58, porous barrier 59, paper 60 and folded anode 61 is similar to that of Figure 1.

Figure 8 shows a battery structure made up of a stack of cells 70 of the type shown in Figure 7. The structure comprises a pair of steel end discs or plates 62 and 63 held together by a pair of thin steel bands 64 and 65 which are welded to opposite edges of the plates. Insulating sheets or discs 66 and 67 of Neoprene or other insulating material are placed against the inside faces of discs 62 and 63 respectively. The cells 70 are stacked between terminal plates 68 and 69 which are held thereby against the insulating discs. Positive and negative battery terminal lugs 71 and 72 are provided on the edges of plates 68 and 69 respectively. The welding of bands 64 and 65 to end plates 62 and 63 is preferably done while the entire stack is held under pressure between them.

In order to insure good sealing pressure on the Neoprene rings 56 of the individual cells, steel rings 73 are stacked between the flanges of the cells. These rings are of the same height as the central part of cups 54 so as to press against flanges 55 when the stack is assembled. These rings can be omitted where the stiffness of the flange is adequate to maintain the pressure. End plates 62 and 63 are slightly larger than the cells so that bands 64 and 65 are spaced away from the cells. If desired an insulating tube can be placed over the stack of cells. It will be noted that all of the cells are connected in series in the battery. Top terminal plates similar to plate 68 can, of course, be interposed at any point desired. Also, by stacking the cells in two directions from a central terminal it is possible to provide two batteries in a single unit, which can be connected independently or in parallel. Further variations of connections of the cells in parallel and series may readily be made.

Figure 9 shows the battery of Figure 8 inserted in a metal can 74 having an insulating top disc formed of a stiff layer 75 of Bakelite or like material and a pliable layer 76 of rubber, Neoprene or the like in which terminals 77 and 78 are riveted. The steel end plate 63 and insulating plate 67 are notched at opposite sides to accommodate insulated wires 79 and 80 connecting the internal battery terminals 71 and 72 to the external terminals 77 and 78. The space around the cells inside the can may be filled with oil, wax or pitch if desired or left dry. Or the stack may be dipped in oil, molten petroleum jelly or wax before placing in the can.

Figure 10 shows a modified top disc and terminal construction for a cell of the type shown in Figure 1. It comprises a top disc 81 which may be of zinc, steel or zinc plated steel, a Neoprene sealing grommet 82 having a flange 84 enclosing the edge of top disc 81 and a zinc contact disc 83. Grommet 82 covers substantially the entire inside face of disc 81 but has a small central aperture. Disc 83 has a central boss 85 which extends through the aperture and is welded at 86 to the center of top disc 81 thereby compressing the Neoprene between the metal discs. This affords an additional seal to prevent electrolyte creepage along the zinc surfaces to the exterior of the cell where it is apt to cause corrosion.

Another method of added protection against creepage corrosion is to spray the outer face of the top disc, except for a central contact area, with Neoprene cement.

So far as I am aware, the prior art has been unable to achieve a commercially successful alkaline dry cell. Some of the operational advantages of my improved dry cell over prior art wet alkaline cells having depolarizer cathodes similar as to chemical make-up to certain depolarizers proposed herein will be made clear from a comparison of the chemical reactions involved at the zinc anodes of two cells, one constructed in accordance with the prior art, and the other in accordance with the present invention and including an alkali metal hydroxide electrolyte substantially saturated with zinc.

In the prior art cell hydrogen gas is generated at the anode both on open and closed circuit, according to the equation:

Zn plus 2KOH=K$_2$ZnO$_2$ plus H$_2$ whereas in the present improved cell substantially presaturated with zincate there is no substantial generation of gas at the anode either on open or closed circuit and any that is formed is diffused out slowly through or past the resilient grommet.

It will be noted that the KOH is continuously regenerated at the cathode so that the composition of the electrolyte remains the same throughout the life of the cell.

With cells of the prior art using an alkaline electrolyte not saturated with zinc oxide the zinc hydroxide formed on the zinc anode was dissolved as fast as produced leaving the zinc exposed but depleting the electrolyte. In such cells, when the electrolyte became saturated with dissolved zinc hydroxide, further operation rapidly coated the electrode with zinc hydroxide which reduced the cell output to a negligible value. Deposit of zinc hydroxide on the electrodes therefore marked the end of the useful life of prior primary cells.

With the zinc oxide saturated electrolyte of the present invention a film of zinc hydroxide begins to form on the anode as soon as the cell is put into use. By use of thin zinc electrode layers of large surface area with the zincate saturated electrolyte, the operation of the cell will take place during the building up of the hydroxide film on the anode. With an electrode of large surface area the zinc hydroxide film thickness is kept low throughout the life of the cell and high internal resistance is avoided.

In order to obtain substantially total consumption of the depolarizer while still maintaining a high current output, it is desirable to have an anode area above about 2 square inches per gram of the depolarizer composition described (mercuric oxide plus 10% graphite). The area should preferably amount to 2.5 square inches per gram of this depolarizer. With cupric oxide depolarizer containing 10% graphite above 5.5 square inches of anode is required per gram of depolarizer, due to its lower molecular weight. Computed in terms of available oxygen in the depolarizer it requires about 30 square inches of anode area per gram of available oxygen. This latter relationship is substantially true for any oxide. However, with cupric oxide depolarizers due to poorer regulation characteristic, the output of the cell may drop below a practically useful value before all the depolarizer is consumed.

It is also essential to have at least 1.2 grams of utilizable zinc in the anode per ampere-hour capacity of the cell. Some zinc in excess of this minimum requirement may be necessary to preserve conductivity in the anode as the zinc is consumed. With the flat cell constructions shown effective use is made of substantially the entire anode area. In some other structures additional zinc area may be required due to less effective use of its area.

The folded, perforated anode construction of Figures 1, 4 and 7 affords a means for obtaining the necessary anode area in a small space.

The relatively close spacing of anode and depolarizer used in these cells is made possible to a large extent by the use of the electrolyte-permeable barrier layer of porous inert material. Paper and other cellulose fibres have a tendency to react chemically with the depolarizer oxide forming a conductive compound. At elevated temperatures this reaction may proceed quite rapidly and, where paper spacers alone are used, may produce a conductive bridge between the electrodes and discharge the cell. By using an inert barrier, such as a pressed disc of magnesium hydroxide, against the depolarizer, such a reaction is prevented.

There is also a reaction between paper and zinc in the electrolyte solution. This is very small if the zinc is amalgamated but will, in time, travel toward the cathode. However, with the inert barrier layer between the paper and the cathode the zinc reaction can never form a bridging path. The paper performs a valuable function in maintaining good electrolyte contact with the zinc anode.

While specific embodiments of the invention have been described, it is intended to cover the invention broadly within the spirit and scope of the appended claims.

What is claimed is:

1. A primary cell comprising a positive terminal plate, a layer of depolarizer on said plate, an electrolyte-permeable barrier layer of porous material inert to the cell electrolyte and the depolarizer on said layer of depolarizer, a porous spacer layer over said barrier layer, an alkaline electrolyte absorbed in said spacer and barrier layers in proportions sufficient to afford a conductive electrolyte path therethrough but insufficient to provide any free-flowing liquid capable of running out of said layers, a zinc anode over said spacer layer and in contact therewith, a negative terminal plate over said zinc anode and having a surface of low electrolytic potential difference to zinc, and an insulating sealing wall between said positive and negative terminals and enclosing the other cell components.

2. A primary electric cell comprising a metal positive terminal plate, a layer of depolarizer thereon, a porous spacer thereover and an alkaline electrolyte absorbed in said spacer in proportions sufficient to afford a conductive electrolyte path therethrough but insufficient to provide any free-flowing liquid capable of running out of said spacer, said spacer including an electrolyte-permeable barrier layer of porous material inert to the cell electrolyte and the depolarizer, a zinc anode over said spacer and in contact therewith, said anode comprising a plurality of thin perforate superimposed layers of zinc electrically joined together, and a negative terminal plate in contact with said anode and having a surface of low electrolytic potential difference to zinc, and insulating sealing means sealing said cell.

3. A primary electric cell comprising a metal positive terminal plate, a layer of depolarizer composition thereon, said composition containing an oxide selected from the group consisting of mercuric oxide and cupric oxide as the active ingredient, a porous spacer thereover and an alkaline electrolyte absorbed in said spacer, said electrolyte being substantially saturated with zinc oxide, said electrolyte permeating said spacer in proportions sufficient to afford a conductive electrolytic path therethrough, said spacer including an electrolyte-permeable barrier layer of porous material inert to the electrolyte and the depolarizer, a zinc anode over said spacer and in contact therewith, said anode having a surface area of at least 2 square inches per gram of depolarizer oxide used, a negative terminal plate in contact with said anode, and insulating means sealing said cell.

4. A primary electric cell comprising a metal positive terminal plate, a layer of depolarizer thereon, a porous spacer thereover and an alkaline electrolyte absorbed in said spacer in proportions sufficient to afford a conductive electrolyte path therethrough but insufficient to provide any free-flowing liquid capable of running out of said spacer, said spacer including an electrolyte-permeable barrier layer of porous material inert to the cell electrolyte and the depolarizer, a zinc anode over said spacer and in contact therewith, said anode comprising a folded perforated zinc foil, a negative terminal plate in contact with said anode, and insulating means sealing said cell.

5. A primary electric cell comprising a metal positive terminal plate, a layer of depolarizer thereon, a porous spacer thereover and an alkaline electrolyte absorbed in said spacer in proportions sufficient to afford a conductive electrolyte path therethrough but insufficient to provide any free-flowing liquid capable of running out of said spacer, said spacer including an electrolyte-permeable barrier layer of porous material inert to the cell electrolyte and the depolarizer, a zinc anode over said spacer and in contact therewith, said anode comprising a folded perforated zinc foil and layers of sheet fibrous material interposed between the folds thereof, a negative terminal plate in contact with said anode, and insulating means sealing said cell.

6. A flat primary cell comprising a shallow metal cup, a layer of depolarizer composition in the bottom of said cup, an electrolyte-permeable barrier layer of porous material inert to the cell electrolyte and the depolarizer over the exposed surface of said layer of depolarizer composition, a porous spacer layer over said depolarizer layer, an alkaline electrolyte absorbed in said spacer and barrier layers in proportions sufficient to afford a conductive electrolyte path therethrough but insufficient to provide any free-flowing liquid capable of running out of said layers, a zinc anode of large surface area over said spacer layer and in contact therewith, a metal top having a surface of low electrolytic potential difference to zinc over said anode, and an insulating sealing ring interposed between said cup and top enclosing the other cell components.

7. A flat primary cell comprising a shallow steel cup, a layer of depolarizer composition in the bottom thereof, said composition containing an oxide selected from the group consisting of mercuric oxide and cupric oxide as the active ingredient and a conduction material mixed therewith, a porous spacer covering said depolarizer layer, said spacer including an electrolyte-permeable barrier layer of porous material inert to said electrolyte and depolarizer, an alkaline electrolyte permeating said spacer in proportions sufficient to afford a conductive electrolytic path therethrough but insufficient to provide any free-flowing liquid capable of running out of said spacer, said electrolyte being substantially saturated with zinc oxide, a zinc anode layer over said spacer and in contact therewith, said anode having a surface area in contact with said electrolyte of at least two square inches per gram of depolarizer oxide in said cell, a metal top having a surface of low electrolytic potential difference to zinc over said anode, and an insulating sealing border interposed between said cup and top enclosing the other cell components.

8. The flat primary cell of claim 7 wherein said anode comprises a folded perforated zinc foil having interposed layers of porous spacer material between the folds thereof impregnated with said electrolyte.

9. A primary cell comprising a depolarizer electrode, a zinc electrode, a porous spacer interposed therebetween, and an alkaline electrolyte in said spacer, said spacer including a porous electrolyte-permeable barrier layer composed of a self-sustaining body of magnesium hydroxide.

10. An electrolyte-permeable barrier layer for dry alkaline primary cells formed of a self-sustaining body of magnesium hydroxide.

11. A primary cell construction comprising a terminal plate having an aperture therein, a pair of metal cups facing opposite sides of said terminal plates and having central projections therein joined together through said aperture, said projections being spaced from the edges of said aperture, sealing rings of insulating material interposed between the rims of said cups and said terminal plate, cell electrodes of one polarity in contact with said cups and electrodes of the opposite polarity in contact with said terminal plate, and cell electrolyte between said electrodes and in contact therewith.

12. An electric current producing cell comprising electrodes, an immobilized electrolyte and an electrolyte permeable barrier between said electrodes consisting substantially of solid magnesium hydroxide.

13. An electric current producing cell comprising a depolarizer electrode, a cooperating electrode, a porous spacer interposed therebetween and an alkaline electrolyte in said spacer, said spacer including a porous electrolyte permeable barrier layer composed of magnesium hydroxide.

14. An electric current producing cell comprising a first terminal member, a depolarizer electrode contacting said terminal member, an electrolyte-permeable barrier of porous material inert to the cell electrolyte and the said depolarizer and in contact with the exposed surface of said depolarizer, a porous spacer in contact with a surface of said barrier, an alkaline electrolyte absorbed in said spacer and barrier in proportions sufficient to afford a conductive electrolyte path therethrough but insufficient to provide free-flowing liquid capable of running out of said spacer and barrier, a zinc electrode in contact with said spacer, a second terminal member having a surface of low electrolyte potential difference to zinc in contact with said zinc electrode, and an insulating sealing member cooperating with said terminal members and defining therewith an enclosure for said cell.

SAMUEL RUBEN.

REFERENCES CITED

The following references are of record in the file of this patent:

UNITED STATES PATENTS

| Number | Name | Date |
|---|---|---|
| 286,809 | Haid | Oct. 16, 1883 |
| 313,615 | Platt | Mar. 10, 1885 |
| 514,845 | Burns | Feb. 13, 1894 |
| 691,611 | DeDion et al. | Jan. 21, 1902 |
| 732,842 | Gardiner | July 7, 1903 |
| 770,277 | Fiedler | Sept. 20, 1904 |
| 1,174,798 | Apple | Mar. 7, 1916 |
| 1,231,057 | Palmer | June 26, 1917 |
| 1,273,447 | Becker | July 23, 1918 |
| 1,291,253 | Thatcher | Jan. 14, 1919 |
| 1,327,017 | Boltshauser | Jan. 6, 1920 |
| 1,331,456 | Ellis | Feb. 17, 1920 |
| 1,467,240 | Doe | Sept. 4, 1923 |
| 1,548,539 | Martus et al. | Aug. 4, 1925 |
| 1,611,153 | Benner et al. | Dec. 21, 1926 |
| 1,688,002 | Cole | Oct. 16, 1928 |
| 2,276,188 | Greger | Mar. 10, 1942 |
| 2,317,711 | Andre | Apr. 27, 1943 |

FOREIGN PATENTS

| Number | Country | Date |
|---|---|---|
| 60,860 | Germany | Feb. 1, 1892 |
| 16,684 | Great Britain | of 1913 |
| 16,471 | Great Britain | of 1915 |

OTHER REFERENCES

Crennell and Lea, Alkaline Accumulators (1928), page 99.

Vinal et al., Circular B. S. #79 (1923), page 7.

Vinal, G. W., "Storage Batteries," 3rd Ed. (1940), page 189.